(12) United States Patent
Ichimaru (10) Patent No.: US 7,794,000 B2
(45) Date of Patent: Sep. 14, 2010

(54) CONFIGURATION FOR OPERATING INTERIOR DEVICE AND CUP HOLDER USING THE SAME

(75) Inventor: Takahide Ichimaru, Chigasaki (JP)

(73) Assignee: NIFCO Inc., Yokohama-shi, Kanagawa (JP)

( * ) Notice: Subject to any disclaimer, the term of this patent is extended or adjusted under 35 U.S.C. 154(b) by 454 days.

(21) Appl. No.: 11/887,621

(22) PCT Filed: Apr. 3, 2006

(86) PCT No.: PCT/JP2006/307512

§ 371 (c)(1),
(2), (4) Date: Oct. 2, 2007

(87) PCT Pub. No.: WO2006/107110

PCT Pub. Date: Oct. 12, 2006

(65) Prior Publication Data

US 2009/0146444 A1     Jun. 11, 2009

(30) Foreign Application Priority Data

Apr. 4, 2005    (JP) .............................. 2005-107375

(51) Int. Cl.
*B60N 3/10* (2006.01)

(52) U.S. Cl. ................ 296/24.34; 296/37.8; 248/311.2; 297/188.15

(58) Field of Classification Search ............... 296/37.8, 296/24.34; 180/315, 333; 248/311.2, 311.3, 248/312, 312.1, 313; 297/188.14, 188.15, 297/188.16, 188.17, 188.19

See application file for complete search history.

(56) References Cited

U.S. PATENT DOCUMENTS

| 7,341,297 B2 * | 3/2008 | Nakamura et al. ........ 296/24.34 |
| 7,354,086 B2 * | 4/2008 | Park ........................ 296/24.34 |
| 7,568,750 B1 * | 8/2009 | Finck et al. ................ 296/37.8 |

FOREIGN PATENT DOCUMENTS

JP    H06-72452 U    10/1994

* cited by examiner

*Primary Examiner*—Joseph D Pape
(74) *Attorney, Agent, or Firm*—Manabu Kanesaka (57) ABSTRACT

In an operating member (2) disposed in a cabin and manually operated by the occupant of a seat and an interior device (8) such as a cup holder allowing its position to be changed with a movable mechanism disposed near the seat, the operating member (2) possesses a detecting sensor (51) for detecting a starting time of a manual operation of the operating member (2) by a hand, and a movable mechanism (25) automatically changes the interior device to a position not to interfere with the manual operation of the operating member in response to the detection signal of the detecting sensor (51).

7 Claims, 7 Drawing Sheets

CONFIGURATION FOR OPERATING INTERIOR DEVICE AND CUP HOLDER USING THE SAME

TECHNICAL FIELD

This invention relates to a configuration for operating an interior device such that, when the interior device (such as, for example, a cup holder) has its position changed within a cabin (including a ship, an electric car, etc. besides an automobile) by means of a movable mechanism, the time for starting the operation of an operating member (such as, for example, a shift lever) is detected so as not to interfere with the manual operation of the operating member and, based on the result of this detection, the change of the position of the interior device is implemented so as not to interfere with the manual operation of the operating member and to a cup holder using the configuration.

BACKGROUND ART

As regards the design of a cabin, one design contemplates furnishing on a center console disposed between a driver seat and an assistant driver's seat with a shift lever as illustrated in FIG. 1 depicting a mode of embodiment of this invention. In this specification, when a cup holder or a containing device is installed by making use of the space lying on the center console and behind the shift lever, the can, cup, beverage container of the shape of a bottle (hereinafter referred to collectively as a "container") can be conveniently taken from the side adjoining the seat.

The containers, however, vary numerously in shape and have their diameters and heights changed depending on the kinds of beverage and their makers. Some, if not all, conventional techniques have entailed the possibility that when a driver, while a container is retained in a cup holder, attempts to operate a shift lever, the container will interfere with the driver's hand and render the operation difficult and that when the container happens to have a large height, the driver's hand will accidentally collide with the container and topple it to spill its content. When the retaining recess constituting a cup holder is given an increased depth to cope with the trouble just mentioned, it renders difficult to extract a container from the recess. The concept of making a retaining recess to enable a bottom receiving part adapted to receive and support a container to change its place vertically in conformity with the height of the container by a height-adjusting means has been developed as disclosed in JP-A 2003-48472 that covers the invention of the present patent applicant.

Though the configuration disclosed in JP-A 2003-48472 mentioned above is capable of enabling a container of varying height to be retained to a preferred height, it is difficult in operation because the bottom receiving part for mounting a container requires its height to be manually adjusted with the height-adjusting means. It is not inconceivable that the container will continue to thrust largely from the retaining recess, depending on the degree of adjustment of height. In this case, the thrust will interfere with the driver's shifting operation as experienced to date.

This invention is aimed at providing a configuration for operating an interior device such that the interior device such as a cup holder is automatically adjusted to the position of optimum height and, when the driver grips an operating member such as the shift lever, the interior device such as the cup holder is moved to a position not to hinder the operation and a cup holder using the configuration.

DISCLOSURE OF THE INVENTION

This invention is directed to generalizing a shift lever in a mode ready for operation as an operating member including another operating lever and a cup holder adapted to include another interior device. In a cabin furnished with an operating member manually operated by a person occupying a driver seat and an interior device disposed near the driver seat and enabled to change its position by a movable mechanism, this invention concerns a configuration for operating the interior device such that the operating member is provided with a detecting sensor capable of detecting the time for starting the person's manual operation and the movable mechanism is enabled to shift the interior device, in response to an operating signal emitted by the detecting sensor, to the position incapable of interfering with the manual operation of the operating member.

This invention, further directed to specifying the mode of embodiment, is aimed at providing a cup holder disposed near a shift lever manually operated by a person occupying the driver seat within a center console and change the height of its container holding part by a movable mechanism, the movable mechanism comprising a driving motor and a controlling part, a detecting sensor disposed in the shift lever to detect the human hand's touch or access and transmit a detection signal to the controlling part, and a switch connected to the controlling part and allowing the retaining part to be adjusted by the switching operation or the detecting sensor via the controlling part and the motor.

In the cup holder mentioned above, the controlling part controls the direction of rotation of the motor so as to switch the retaining part to its descending position only when the retaining part is placed at its ascending position in response to a detection signal from the detecting sensor and as well controls the direction of rotation of the motor so as to switch the retaining part to its ascending position when the detection signal from the detecting sensor ceases to exist.

The cup holder mentioned above possesses a detecting sensor disposed on the upper edge of the retaining part and allowed to detect a human hand's touch and enables the motor to be rotated normally or backward via the controlling part in proportion to the duration of a hand's touch on the detecting sensor.

The cup holder mentioned above has the aforementioned retaining part and movable mechanism built in a case embedded in the center console and opened upward and as well has the opening in the case enabled to be opened and shut by a sliding shutter.

The cup holder mentioned above preferably enables the mobile mechanism serving to open or shut the shutter and the movable mechanism serving to change position to be selectively connected to the motor via a clutch, for example.

This invention enables the operating member in the cabin to retain ideal operability constantly because the manual operation of the operating member, even when it is implemented while the interior device happens to occupy a position apt to interfere with the manual operation, and comprises detecting a time for starting the manual operation with the detecting sensor and driving and controlling the movable mechanism based on the resultant detection signal and consequently enabling the switch of the interior device to a position incapable of hindering the manual operation.

This invention further enables the shift lever in the cabin to retain ideal operability and as well prevents it from accidentally toppling a container because the manual operation of the shift lever, even when it is implemented while the container retaining part happens to occupy a position apt to interfere with the manual operation, and comprises detecting the time for starting the manual operation with the detecting sensor and driving and controlling the movable mechanism based on the resultant detection signal and consequently enabling the switch of the container retaining part to a position incapable of interrupting the manual operation.

Further, this invention enables the retaining part by the operation of the shift lever to be lowered in conjunction with the container without causing any hindrance and enables it by the completion of the shift lever operation to be switched in conjunction with the container to a raised position allowing easy extraction. This function results in imparting facility and feeling of high quality to the cup holder.

This invention is further capable of deciding the distance of descent or ascent of the container retaining part via the movable mechanism in proportion to the duration of a hand's touch of the detecting center and adjusting this distance to the optimum height.

Further, this invention allows endowment of the advantage of unitization and enables the cup holder to retain ideal outward appearance in its unused state by having the opening covered with the shutter.

This invention, even when it is used by a sole motor, enables the driving force of the motor to be used both for a shutter-moving mechanism and a movable mechanism on the container retaining part via a clutch, for example.

BEST MODE FOR CARRYING OUT THE INVENTION

Figures 1A, 1B:
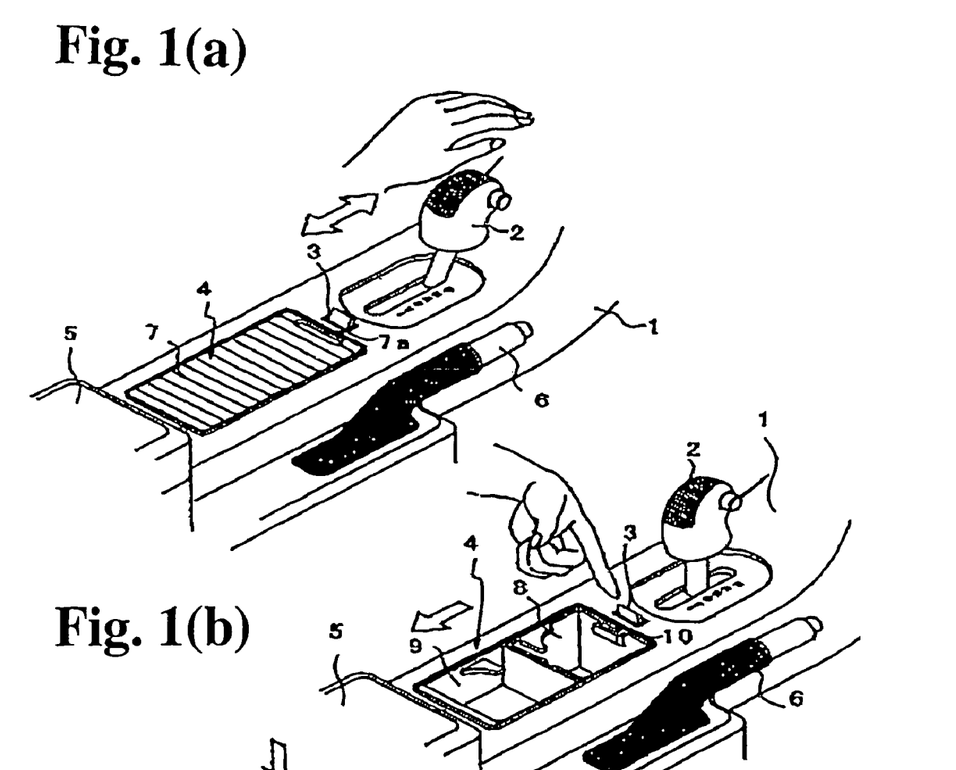
FIG. 1(a) is a perspective view illustrating a cup holder in an unused state.
FIG. 1(b) is a perspective view illustrating the cup holder having its shutter held in an opened state.
Figure 1C:
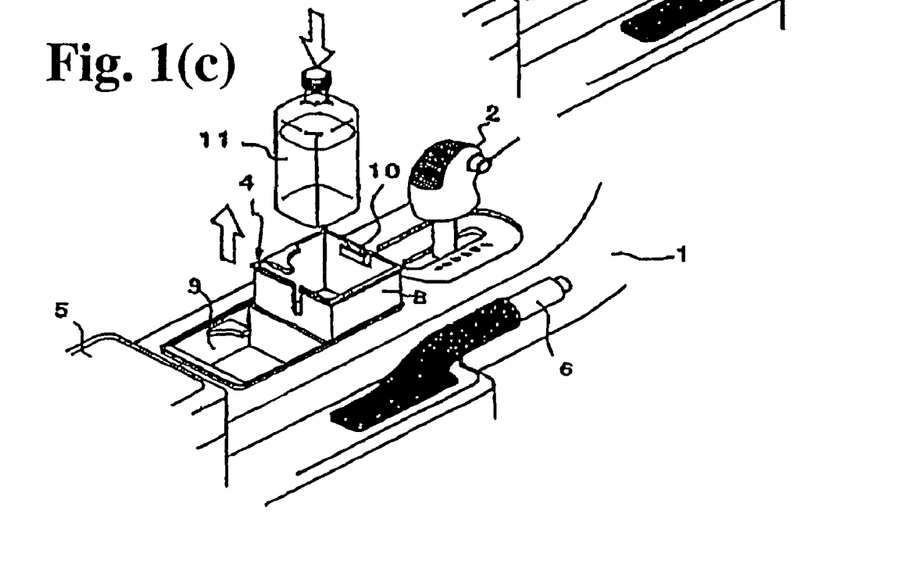
FIG. 1(c) is a perspective view illustrating the cup holder having its retaining part thrust upward and held in a state storing a container of large height.
Figure 2:
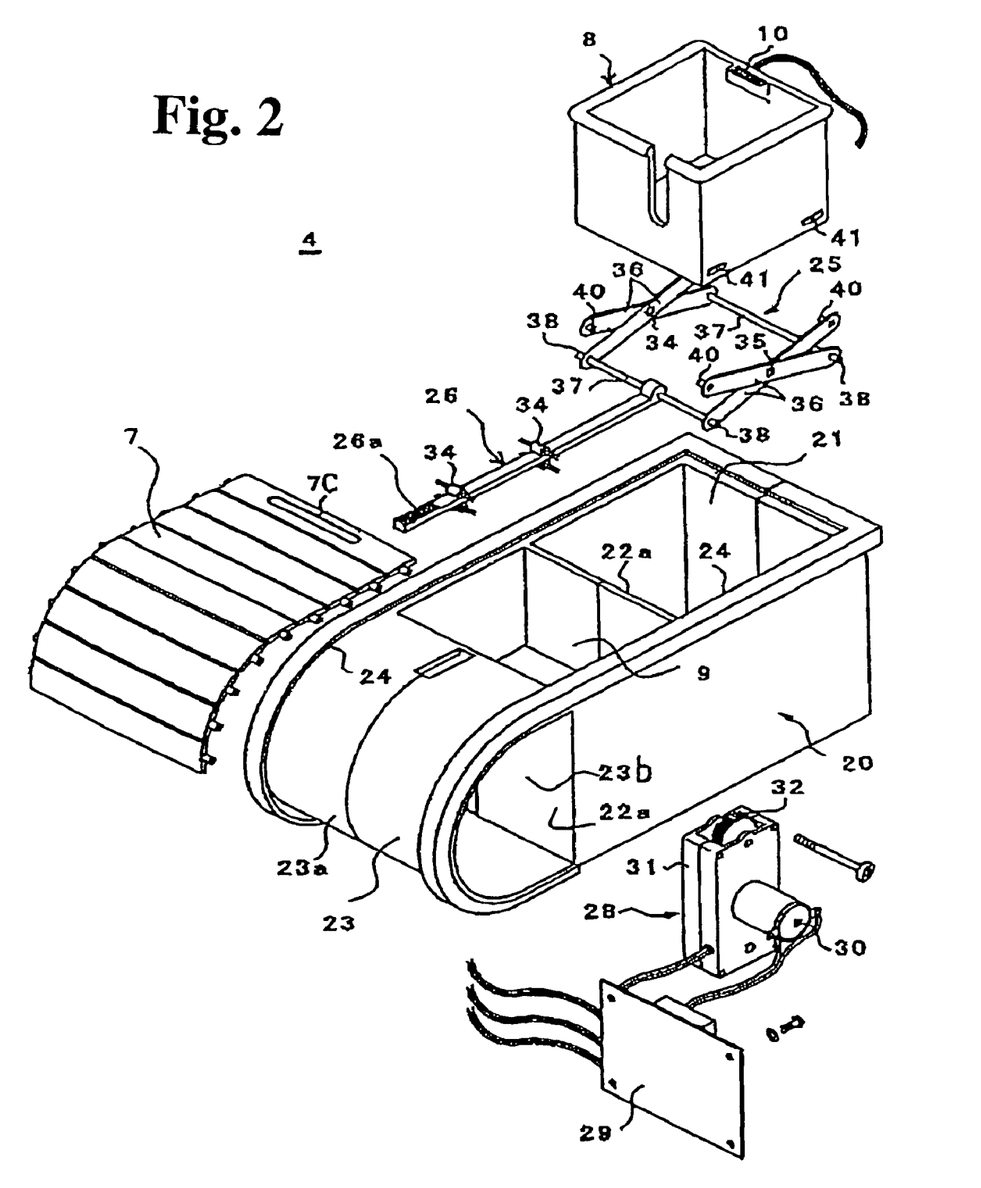
FIG. 2 is an exploded perspective view of a cup holder conforming to this invention.
Figure 3:
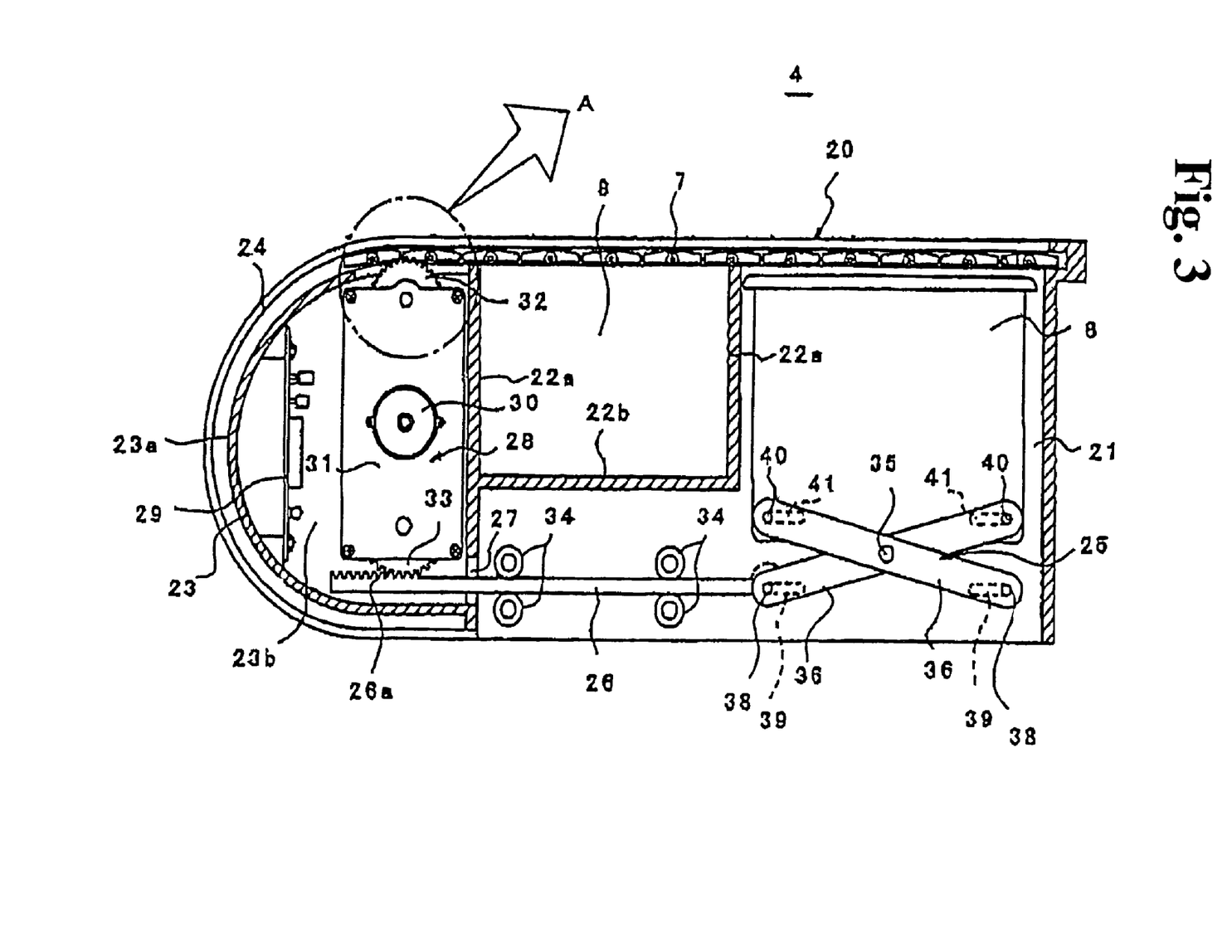
FIG. 3 is a section illustrating the aforementioned cup holder in an assembled state.
Figure 4:
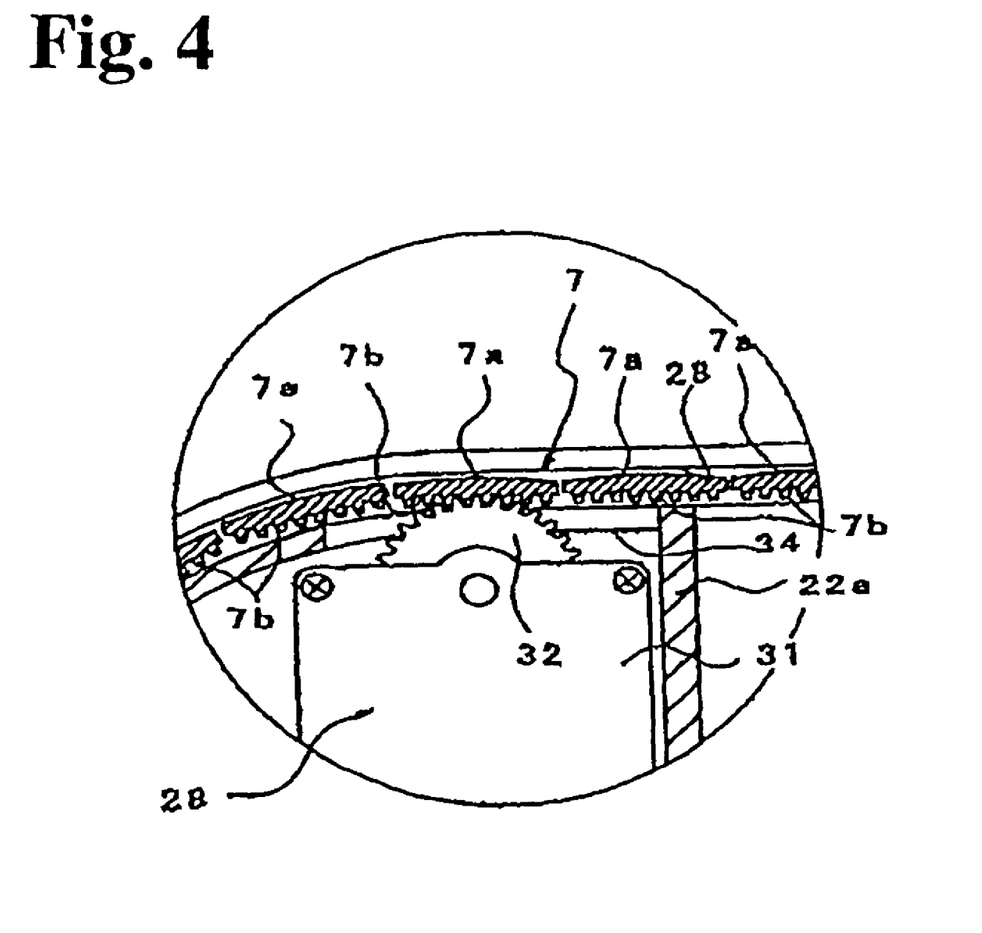
FIG. 4 is an enlarged view of a part A shown in FIG. 3.
Figure 5:
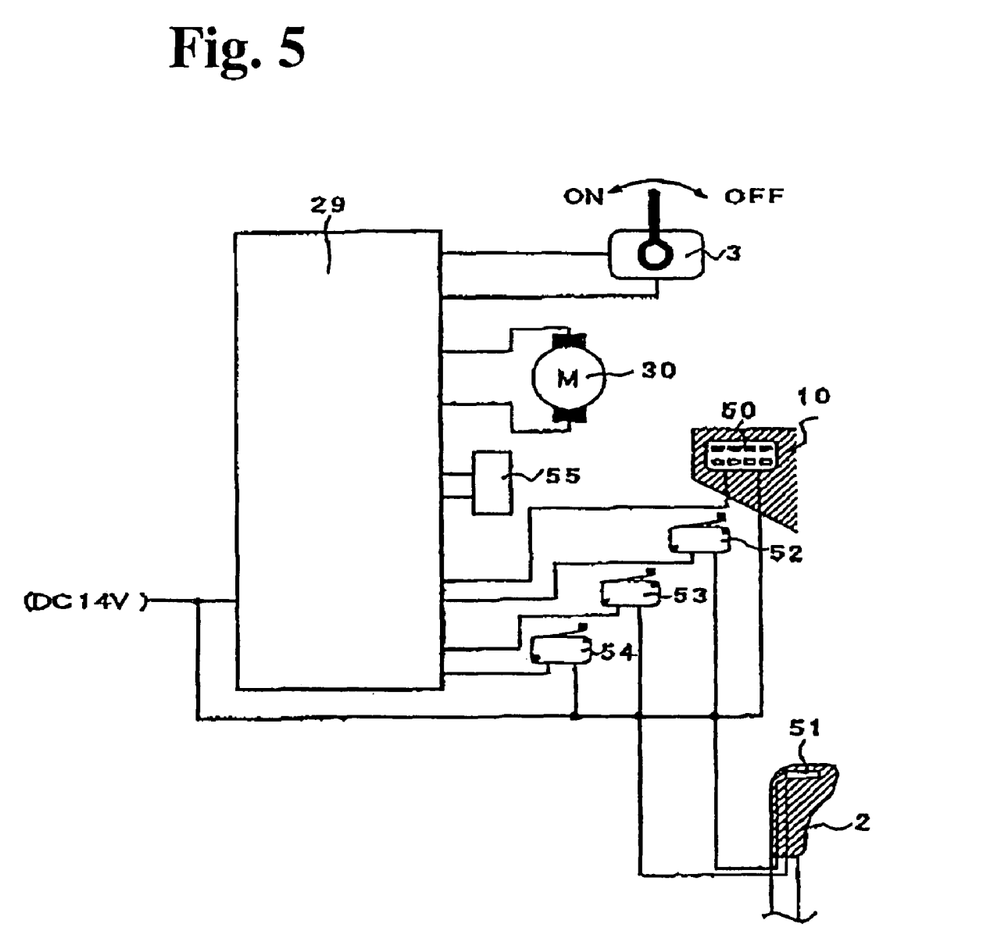
FIG. 5 is a block diagram illustrating an electrical construction of the aforementioned cup holder.
Figure 6:
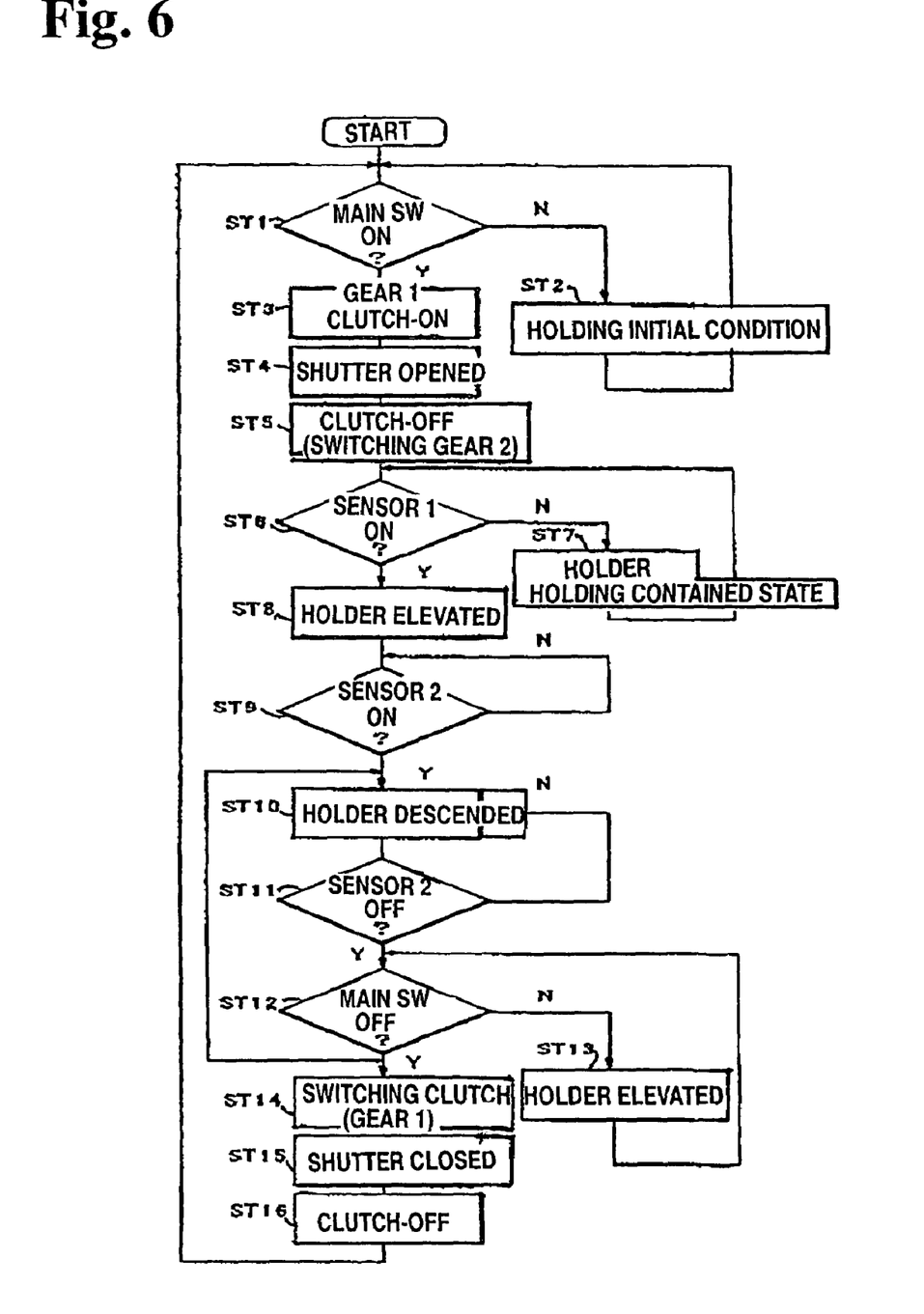
FIG. 6 is a flow chart illustrating a method of control performed by a controlling board contained in the aforementioned cup holder.
Figure 7A:
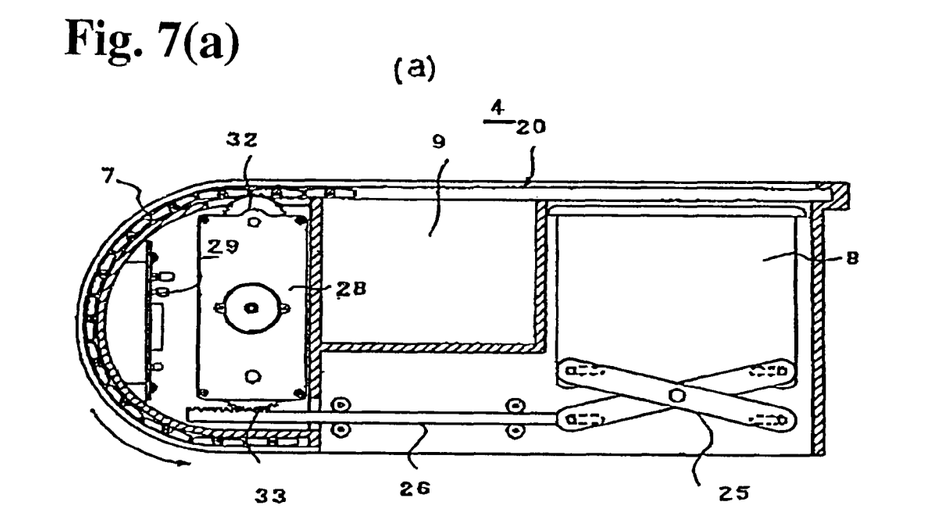
FIG. 7(a) is a cross section illustrating a retaining part in a state lowered into the case.
Figure 7B:
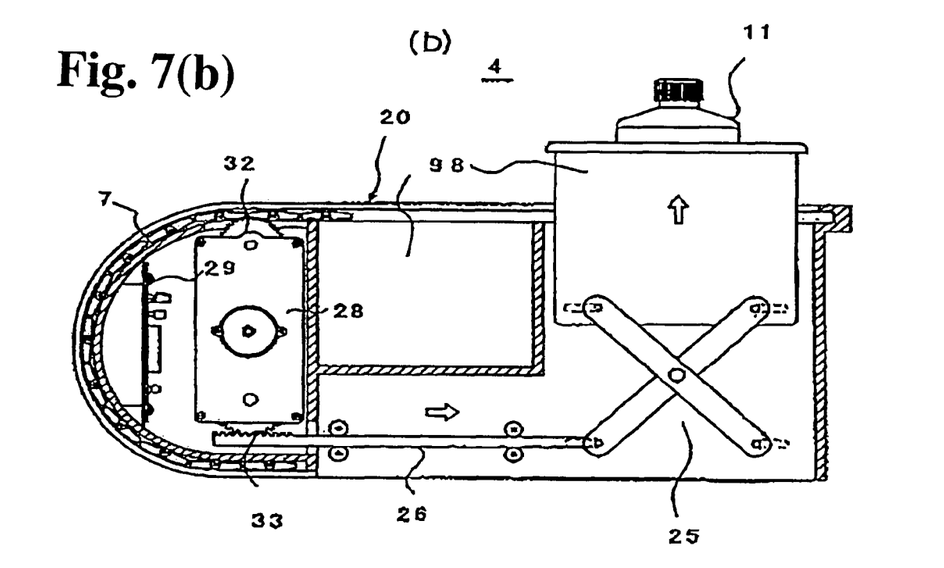
FIG. 7(b) is a cross section illustrating the retaining part in a state elevated in the case.

The mode of embodying this invention will be explained by reference to the accompanying drawings. FIG. 1(a)-1(c) are schematic explanatory diagrams near a center console furnished with a cup holder, FIG. 2 is a perspective view illustrating the essential part of the cup holder in an exploded state, FIG. 3 is a longitudinal cross section illustrating the cup holder in an assembled state, FIG. 4 is an enlarged drawing of a part A shown in FIG. 3, FIG. 5 is a block diagram illustrating the circuit construction of the cup holder, FIG. 6 is a flow chart illustrating an example of control performed by a controlling part, FIGS. 7(a) and 7(b) are sections illustrating the operation of the cup holder from the step of opening the shutter through the step of elevating the retaining part. In the following explanation, the outline of the whole cup holder, the configuration of the cup holder, the electrical construction, and the example of control will be described in detail sequentially in the order mentioned.

(Whole outline) Referring to FIG. 1, a center console 1 is interposed between a driver seat and an assistant driver's seat (both not shown) on the front side of a cabin. On the center console 1, a shift lever 2 is disposed on the front side, a toppling main switch 3 and a cup holder 4 embodying this invention are disposed behind the shift lever 1, and an arm rest 5 is disposed at a position further behind them at a level one step higher than them. On the lateral part of the center console 1, a brake lever 6 is disposed at a side one step lower than the driver seat. Here, the cup holder 4 has its upper opening shut with a shutter 7 in the unused state of FIG. 1(a) to retain the outward appearance of the center console in the unused state. When the main switch 3, while the cup holder 1 is remaining in the aforementioned state, is turned down toward the "in" side as illustrated in FIG. 1(b), the shutter 7 is automatically slid in the opening direction and made to expose the interior thereof. Incidentally, the shutter 7 is provided on the upper front side thereof with a concave pulling handle 7c, which enables the shutter 7 to be manually slid and allows the upper opening of the cup holder 1 to be opened or shut.

Inside the cup holder 4, an elevating retaining part 8 shaped like a deep-bottomed container is disposed on the front side and a fixed retaining part 9 shaped like a shallow-bottomed container ordinarily usable as a coin holding purse or a simple cup holder is disposed on the side behind the elevating holding part 8. The fixed retaining part 9, however, may be omitted.

The retaining part 8 has, on a part of its upper edge, a housing part 10 for a sensor that will be described herein below. By touching a sensor 50 mounted on the housing part 10 (refer to FIG. 5), the retaining part 8 is caused to thrust upward from the center console 1 as shown in FIG. 1(c) and, in the thrust state, a container 11 of a comparatively large height such as a PET bottle can be retained. This sensor 50 may be of the type capable of detecting access of a hand instead of a touch. Though the retaining part 8 is disposed in FIG. 1(c) in a state elevated to the uppermost position, it is functionally enabled, similarly to a power window, to adjust the height of its thrust in proportion to the duration of the touch on the sensor 50. While the housing part 10 is depicted as disposed on the inner side of the upper edge of the retaining part 8, it may be disposed on the upper surface or on the outside. The retaining part 8 described above is adapted to induce a reverse motion, namely a descending motion from the state of FIG. 1(c), in response to the switching motion of the main switch or the touch of the driver's hand on the upper knob of the shift lever 2. Here, while the main switch continues to remain in the "on" position, the separation of the hand from the knob of the shift lever 2 mentioned above results in inducing automatic elevation of the retaining part 8. By turning the switch 3 to the "off" position, the retaining part 8 is made to descend and the shutter 7 is made to slide in its closing direction.

(Mechanical configuration of the cup holder) FIG. 2 and FIG. 3 illustrate the detailed configuration of the cup holder 4 mentioned above. This cup holder 4 possesses a case 20 embedded in the center console 1. This case 20 is a rectangular product of resin injection molding having an upper opening that is halved in the direction of width. It is composed of a vertically opening housing part 21 disposed on the front side and adapted to house the retaining part 8 in an elevating state, the aforementioned retaining part 9 disposed on the rear part of the housing part 21 and defined by a partition wall 22a and a bottom plate 22b constituting a longitudinal pair, and a semi-cylindrical part 23 formed continuously to the retaining part 9 across the hind-side partition wall 22a, with the outer peripheral surface of the semi-cylindrical part 23 serving as a housing part 23a for the shutter 7 and the inner side thereof serving as a mechanical room 23b. Graphically, the interior of the retaining part 8 is omitted. Actually, a binding tool such as a toppling auxiliary holder adapted to allow stable retention of a bottle or a can is installed additionally.

In the case 20 mentioned above, a pair of guide grooves 24 adapted to be inserted in the opposite edge parts of the shutter across an interval from the opposite sides of the upper edge part of the opening toward the opposite side parts of the housing part 23a and enabled to guide the shutter in a sliding manner are formed. In the lower part of the housing part 21, an elevating pantograph 25 is connected to the retaining part 8 and one end of a link rod 26 is connected to the pantograph 25. The other end of the link rod 26 communicates with the interior of the mechanical room 23b via a notch 27 that is opened from within the retaining part 9 toward the back partition wall 22a.

In the mechanical room 23b, a drive unit 28 connected alternately to the shutter 7 and the link rod 26 and adapted to drive them and a controlling part for the drive unit 28, i.e. a controlling board 29 are housed and retained. Though the details of the drive unit 28 are omitted, this drive unit 28 is furnished with at least a DC motor 30 for the sake of a gear box 31 and a power transmission mechanism to be coupled with the output shaft of the motor 30.

The gear box 31 is fixed at the center in the direction of width of the mechanical room 23b via stops, for example. The box incorporates therein a gear ring train constituting a power transmission mechanism (not shown) linked to the output shaft of the motor 30, a clutch to be described herein below, and a switching mechanism for the clutch. It also possesses the components of the power transmission mechanism, i.e. a gear 32 disposed as partly projecting from a window opened in the upper part of the gear box 31 and adapted to drive the shutter 7 and a gear 33 disposed as partly projected from a window opened in the lower part of the gear box 31 and adapted to be meshed with rack teeth disposed on the other terminal side of the link rod 26. While either of the gears 32 and 33 is retained by the aforementioned clutch and its switching mechanism in a state of forming a working linkage with the output shaft of the motor 30, the other gear is in its "off" state. The gear 32 thrusts above the semi-cylindrical part 23 via a window opened at the center of the upper part of the mechanical room 23a and links to individual slits constituting the shutter 7.

FIG. 4 illustrates the state of this linkage. Referring to FIG. 4, the shutter 7 is constructed by flexibly connecting individual slats 7a via intervening hinges and has rack teeth 7b notched along its sliding direction in the lateral intermediates on its lower surface. The rack teeth 7b are meshed with the gear 32 when the shutter 7 is imposed on the case 20 side and the shutter 7 is enabled to slide toward the closing side of the upper surface of the case 20 or toward the housing part 23a side respectively by the normal or reverse rotation of the gear 32. When the clutch mentioned above is changed, the gear 32 assumes an idle state, in which the shutter 7 can be opened or shut while the gear 32 is kept in idle rotation. The gear 33 is intended to stretch the pantograph 25 and elevate the retaining part 8 by causing itself to be meshed with rack teeth 26a notched on the other terminal side of the link rod 26 and enabling the link rod 26 in the meshed state to be moved in the longitudinal direction. In FIG. 3, the reference numeral 34 denotes a pair of guide rollers adapted to support the upper and lower ends of the link rod 26.

The pantograph 25 results from linking a pair of left and right link plates 36 intersecting in the shape of the letter X via a fulcrum pin 35 with the one-side lower terminals of the individual link plates 36 via connecting rods 37 (refer to FIG. 2). To the connecting rod 37 on the back side, one terminal, namely the front terminal, of the link rod 26 mentioned above is connected. In this configuration, as illustrated in the pattern in FIG. 2 and FIG. 3, the link plates 36 each possess a lower pin 38 projecting from the lower terminal outer surface and an upper pin 40 projecting on the upper terminal inner side, the lower pin 38 mentioned above is inserted in a pair of guide grooves 39 disposed in the corresponding part of the inner side wall of the case 20, and the upper pin 40 mentioned above is inserted in a pair of guide grooves 41 disposed on the lower opposite sides of the retaining part 8. As depicted in FIG. 3, the link plates 36 form an intersecting angle close to horizon and are in the state of being completely included in the case 20. The traction of the link rod 26 generated via the gear 33 of the drive unit 28 in this state induces elevation of the retaining part 8 by enabling the link plates 36 to stand up in consequence of the motion of the pins 38 and 40 in the corresponding guide grooves 39 and 41. Incidentally, at the elevated position, since the gear 33 is continuously connected to the output shaft of the motor 30 via a clutch (not shown) and the connection is retained via such a rotation transmitting mechanism as a worm wheel and a worm, for example, without necessitating any special locking mechanism, the retaining part 8 remains in the state of being retained at the elevated position even when the retaining part 8 stores the container of large weight.

(Electrical construction of cup holder) FIG. 5 illustrates an example of the connection of various parts to the controlling board 29. To be specific, the controlling board 29 has connected thereto a main switch 3, a touch sensor or a capacitance sensor (indicated as "sensor 1" in FIG. 6) 50 disposed in the housing part 10 of the retaining part 8, a touch sensor or a capacitance sensor (indicated as "sensor 2" in FIG. 6) disposed in the shift lever 2, shut position detecting micro switches 52 disposed at various parts of the interior of the case 20 as means for detecting the shutter 7, intermediate position detecting micro switches 53, and shut position detecting micro switches 54. To the output side, the motor 30 and a controlling system 55 for the aforementioned clutch are also connected. Incidentally, the controlling board 29 mentioned above is driven by a DC 14V power source that is a power source in the cabin and is enabled to receive detection signals from the aforementioned switch and sensors and drive and control the aforementioned motor 30 and the clutch controlling system.

(Controlling method) An example of the controlling method by the use of the controlling board 29 mentioned above will be explained by reference to the flow chart of FIG. 6 and by supplemental reference to FIG. 3 and FIGS. 7(a) and 7(b). In FIG. 6, the retaining part 8 is indicated as a holder. FIG. 3 illustrates the unused state (initial state) in which the retaining part 8 is lowered and contained in the case 20, the upper opening of the case 20 is shut with the shutter 7 and the interior of the case 20 remains in the initial state (Steps ST 1 and 2). When the main switch 3 in this state is turned on, the output shaft of the motor 30 is connected to the gear 32 via the aforementioned clutch, for example, and, as a result of the rotation of the gear 32 on the open side of the shutter, the upper opening of the case 20 is opened as illustrated in FIG. 7(a), the motor 30 is stopped subsequent to the detection of the aforementioned switch 54 at the open position and the aforementioned clutch is switched toward the gear 33 side (Steps ST 3-5). In this state, the retaining part 8 retains its lowered and contained state in the absence of a finger's touch on the sensor 1 (50) of the retaining part 10. When the sensor 1 (50) of the retaining part 10 is exposed to the touch of a finger, the resultant touch signal is sent to the controlling board 29 and the signal issued consequently from the controlling board 29 switches the clutch and imparts normal rotation to the gear 33. Then, the pantograph 25 is induced to produce an ascending motion via the operation of the link rod 26. As a result, the retaining part 8 is switched to its elevated position as illustrated in FIG. 7(b) (Step ST 8).

As a result, the retaining part 8 in its elevated position causes the container 11 such as a PET bottle to be retained in the recess or allowed by a simple access. The action that induces free adjustment of the retaining part 8 in height in conformity with the duration of the contact with the sensor 1 (50) is similar to the power window of an automobile, for example. Specifically, when the touch of the sensor 1 (50) is further continued subsequent to imparting to the retaining part 8 at the state of occupying the position of the largest elevation, the descending motion is performed again in proportion to the duration of the touch and the controlling board 29 outputs a signal for normal or reverse rotation to the motor 30 so that the ascending and descending motions may be repeated thereafter in an amount again proportional to the duration of the touch. When the controlling board 29 receives the control signal from the sensor 2 (51) of the shift lever 2 when the driver grips the shift lever 2 and starts a shifting operation, the controlling board 29 issues a signal for reverse rotation to the motor 30 and, based on the signal, the retaining part 8 descends via the aforementioned clutch and gear 33 and enabled to prevent the interruption caused by a projecting object such as the container 11 during the course of the shifting operation (Steps ST 9 and 10).

When the sensor 2 (51) is turned off, i.e. when the driver moves his hand off the shift lever 2 and nevertheless the main switch 3 is not turned off, the controlling board 29 issues a signal for normal rotation to the motor 30 and, based on this signal, the retaining part 8 is again induced to ascend and thereafter this motion is repeated each time the touch and the release of the shift lever 2 are implemented (Steps ST 11-13). On the other hand, when the controlling board 29 assumes the "off" state because the main switch is turned off, the aforementioned clutch as held in the state keeping the retaining part 8 in its lowered position is switched over toward the gear 32 side, the shutter 7 is slid to its closed position by the driving force of the motor 30, and the motor 30 is stopped and the clutch is turned off in response to the detection signal of the aforementioned switch 52 (Steps ST 14-16). Incidentally, the shutter 7 is not wholly closed when it is exposed to the interference of the projecting part such as the container 11. In this case, the detecting mechanism such as a torque limiter is actuated and the motor 30 is stopped and the clutch is also turned off. When the retaining part 8 remains in its elevated position while the main switch 3 is in its "off" state, the process is shifted to Step ST 10, wherein the lowering motion of the retaining part 8 is performed, the shutting process of Steps ST 14-16 is repeated, and the process assumes the state of waiting for the instruction from Step ST 1.

This invention is not restricted in any sense to the foregoing mode of the embodiment. For example, the construction disclosed in JP-A 2003-48472 mentioned above may be adopted as the retaining part 8 or the retaining part may be vertically moved by some other mechanism than the pantograph 25 serving a mechanism for elevation or motion. Notwithstanding the foregoing description to the effect that the rotating motion of the gear 33 is converted to a linear motion by the meshing of the rack teeth 26a and the gear 33 on the link rod side, some other mechanism for the transformation of rotation-linear or reciprocating motion may be used without entailing any inconvenience.

INDUSTRIAL APPLICABILITY

This invention enables the interior device such as a cup holder to be automatically adjusted to the position of the optimum height and as well allows the driver of a car, while taking hold of the operating member, to move the interior device such as a cup holder to a position incapable of interfering with his operation. The driver, therefore, is enabled to operate the shift lever safely and enjoy a pleasant drive.

What is claimed is:

1. A cup holder installed in a center console near a manually operated shift lever, the cup holder comprising: a container retaining part and a moving mechanism for adjusting a height of the container retaining part,
   wherein the moving mechanism comprises a driving motor, a controlling part which controls said motor, a detecting sensor which is disposed in said shift lever to detect a hand and transmit a resultant detection signal to said controlling part, and a switch connected to said controlling part, the height of said container retaining part being adjusted by said motor in response to an operation of the switch or the detecting sensor.

2. A cup holder according to claim 1, wherein said controlling part controls a direction of rotation of said motor so as to move said container retaining part in an elevated position to a lowered position in response to the detection signal from said detecting sensor, and when the detection signal from said detecting sensor ceases, said controlling part controls the direction of rotation of said motor so as to move said container retaining part back to the elevated position.

3. A cup holder according to claim 1, wherein said container retaining part has an upper edge, the upper edge being provided with the detecting sensor for detecting the hand on the upper edge, the detecting sensor providing an edge touch indicative signal to the controlling part to induce one of a forward or reverse rotation of said motor in accordance with a duration of the edge touch indicative signal.

4. A cup holder according to claim 1, wherein said container retaining part and the moving mechanism are incorporated in a case, said case having a sliding shutter.

5. A cup holder according to claim 4, wherein the moving mechanism is operatively connected with said shutter for selectively opening and closing said shutter.

6. A cup holder according to claim 4, wherein said motor is disposed in a drive unit having a first drive gear at an upper end and a second gear at a lower end, the first gear engaging teeth formed on a lower surface of the slider and the second gear engaging rack teeth formed in a rack operatively connected with a mechanism which raises and lowers the container retaining part with respect to the case of the cup holder.

7. A cup holder according to claim 6, wherein the mechanism which raises and lowers the container retaining part comprises a pantograph, the pantograph having a link connected with the rack.

* * * * *